(12) United States Patent
Yasui et al.

(10) Patent No.: US 11,933,802 B2
(45) Date of Patent: Mar. 19, 2024

(54) AUTOMATIC ANALYSIS DEVICE

(71) Applicant: HITACHI HIGH-TECH CORPORATION, Tokyo (JP)

(72) Inventors: Akihiro Yasui, Tokyo (JP); Takeshi Setomaru, Tokyo (JP); Akinori Kiyokawa, Tokyo (JP); Masashi Fukaya, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 357 days.

(21) Appl. No.: 17/600,134

(22) PCT Filed: Mar. 5, 2020

(86) PCT No.: PCT/JP2020/009422
§ 371 (c)(1),
(2) Date: Sep. 30, 2021

(87) PCT Pub. No.: WO2020/217732
PCT Pub. Date: Oct. 29, 2020

(65) Prior Publication Data
US 2022/0170956 A1    Jun. 2, 2022

(30) Foreign Application Priority Data

Apr. 26, 2019  (JP) .................................. 2019-084989

(51) Int. Cl.
G01N 35/00  (2006.01)
G01N 35/10  (2006.01)
G01N 35/04  (2006.01)

(52) U.S. Cl.
CPC . *G01N 35/1004* (2013.01); *G01N 2035/0441* (2013.01); *G01N 2035/0443* (2013.01)

(58) Field of Classification Search
None
See application file for complete search history.

(56) References Cited

U.S. PATENT DOCUMENTS

2005/0207938 A1* 9/2005 Hanawa ............. G01N 35/1002
422/64
2007/0104614 A1    5/2007 Wang
(Continued)

FOREIGN PATENT DOCUMENTS

EP    1 460 432 A1    9/2004
EP    2 835 649 A1    2/2015
(Continued)

OTHER PUBLICATIONS

Extended European Search Report received in corresponding European Application No. 20795686.3 dated Dec. 16, 2022.
(Continued)

*Primary Examiner* — Brandi N Hopkins
*Assistant Examiner* — Nigel H Plumb
(74) *Attorney, Agent, or Firm* — MATTINGLY & MALUR, PC

(57) ABSTRACT

There is provided an automatic analysis device with a structure in which a measurement unit is less susceptible to disturbance as compared to a device in the related art, and a method of designing the automatic analysis device. A first rotation axis 301 of a reaction disk 1, a second rotation axis 302 of a reagent disk 9, and a measurement unit are arranged on the same straight line 311 when an automatic analysis device 100 is viewed from an upper surface side, the first rotation axis 301 of the reaction disk 1 is arranged between the second rotation axis 302 of the reagent disk 9 and the measurement unit, and the measurement unit is arranged on a front side to be accessed by a user of the automatic analysis device 100.

14 Claims, 9 Drawing Sheets

(56) References Cited

U.S. PATENT DOCUMENTS

| | | | | |
|---|---|---|---|---|
| 2009/0031789 A1* | 2/2009 | Murakami | ........... | G01N 35/025 |
| | | | | 73/61.49 |
| 2012/0282683 A1* | 11/2012 | Mototsu | ................. | G01N 33/53 |
| | | | | 422/69 |
| 2014/0271369 A1* | 9/2014 | Fritchie | ................ | G01N 35/025 |
| | | | | 422/68.1 |
| 2014/0286824 A1 | 9/2014 | Yasui et al. | | |
| 2019/0346468 A1* | 11/2019 | Nakasawa | .............. | G01N 35/04 |
| 2020/0009572 A1 | 1/2020 | Yasui et al. | | |

FOREIGN PATENT DOCUMENTS

| | | |
|---|---|---|
| JP | 2005-037171 A | 2/2005 |
| JP | 2009-036666 A | 2/2009 |
| JP | 2012-141246 A | 7/2012 |
| WO | 2011/089966 A1 | 7/2011 |
| WO | 2013/058170 A1 | 4/2013 |
| WO | 2018/135384 A1 | 7/2018 |
| WO | 2018/168632 A1 | 9/2018 |

OTHER PUBLICATIONS

International Search Report of PCT/JP2020/009422 dated Apr. 28, 2020.

\* cited by examiner

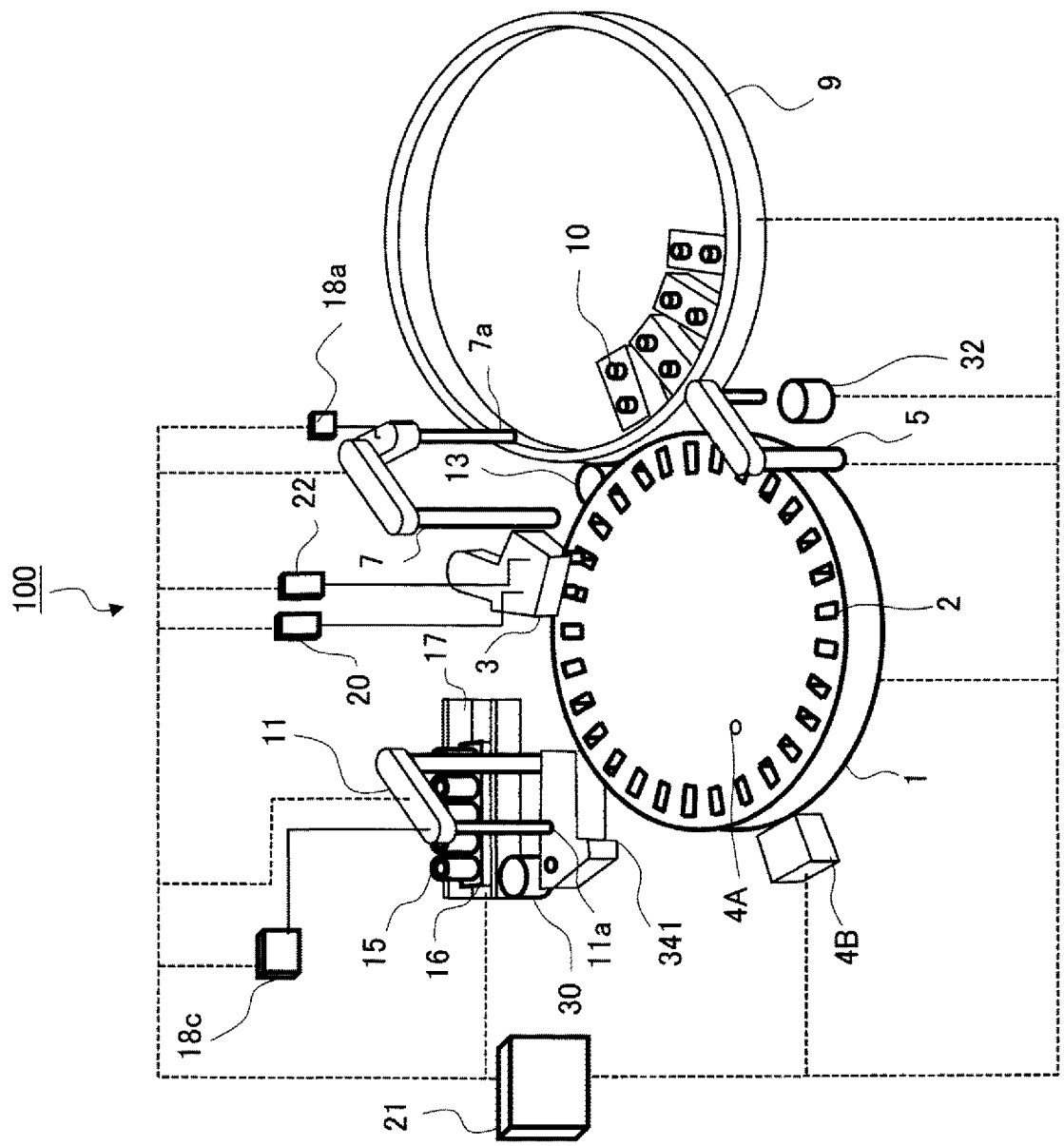
[FIG. 1]

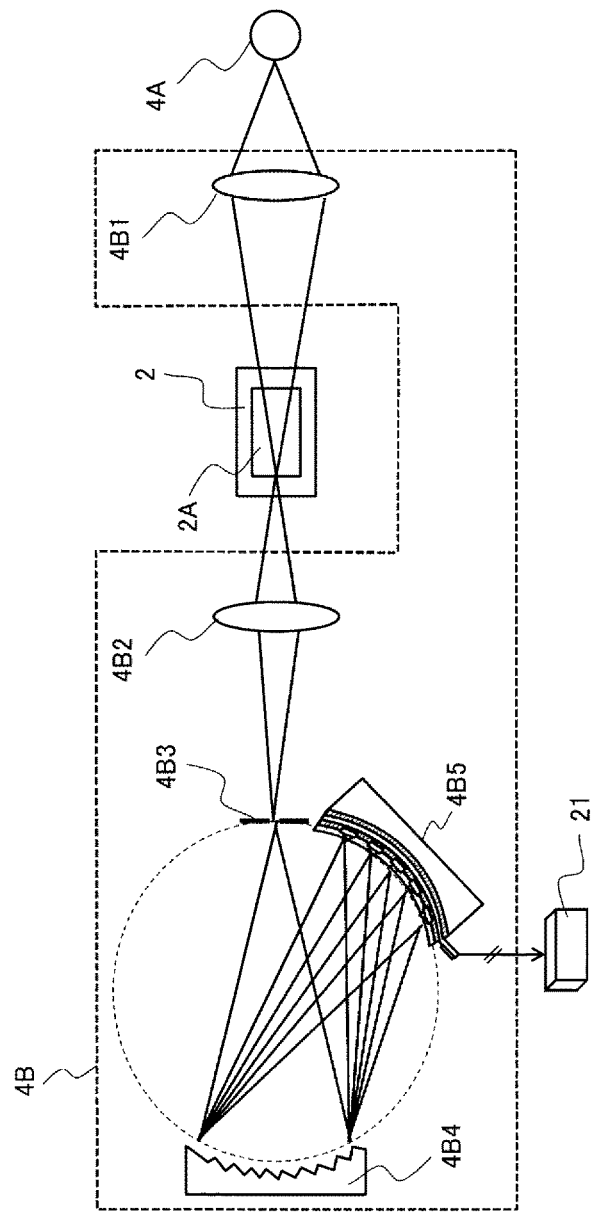
[FIG. 2]

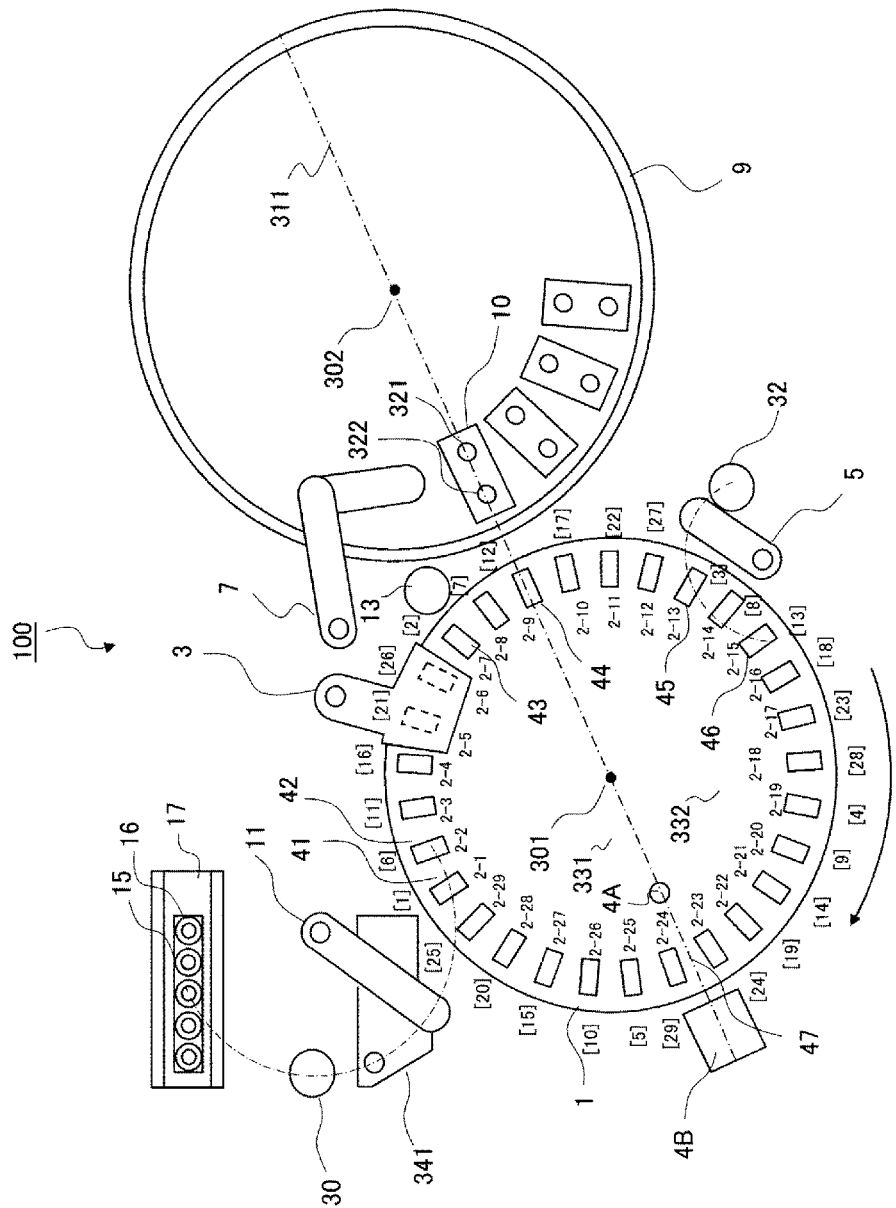
[FIG. 3]

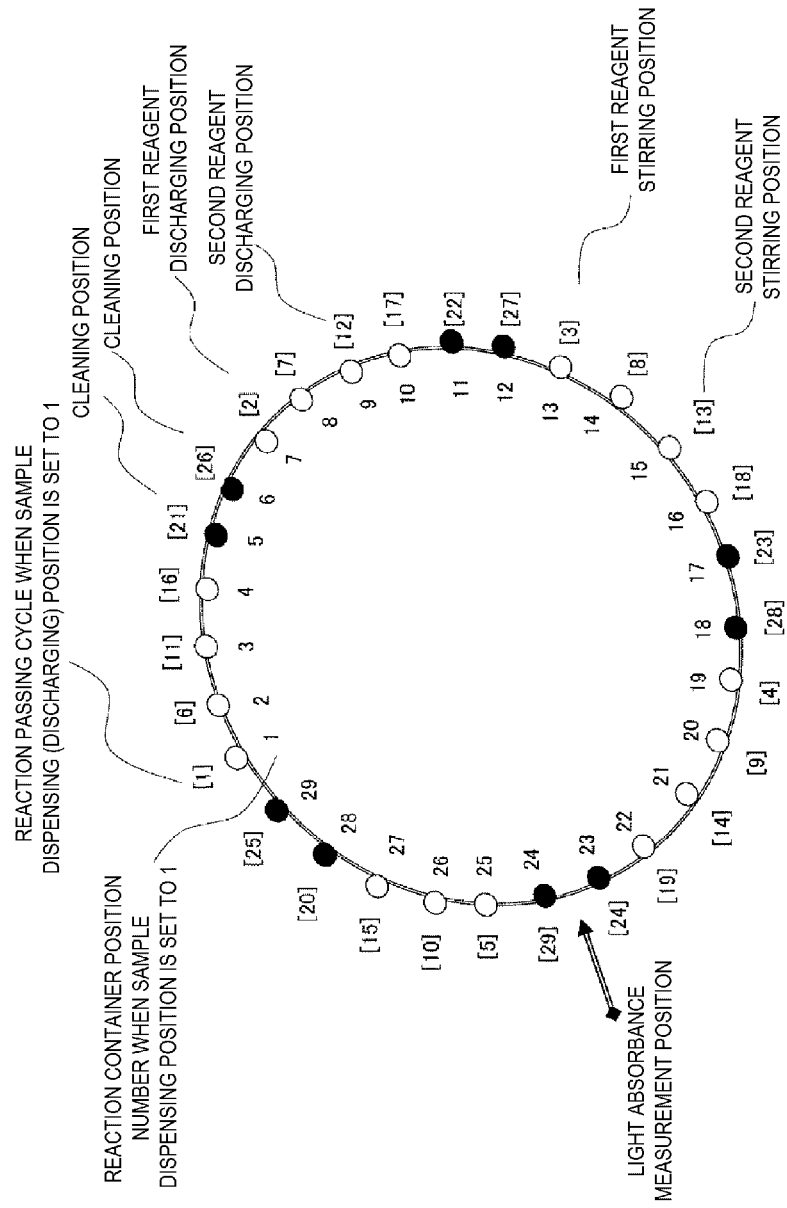
[FIG. 4]

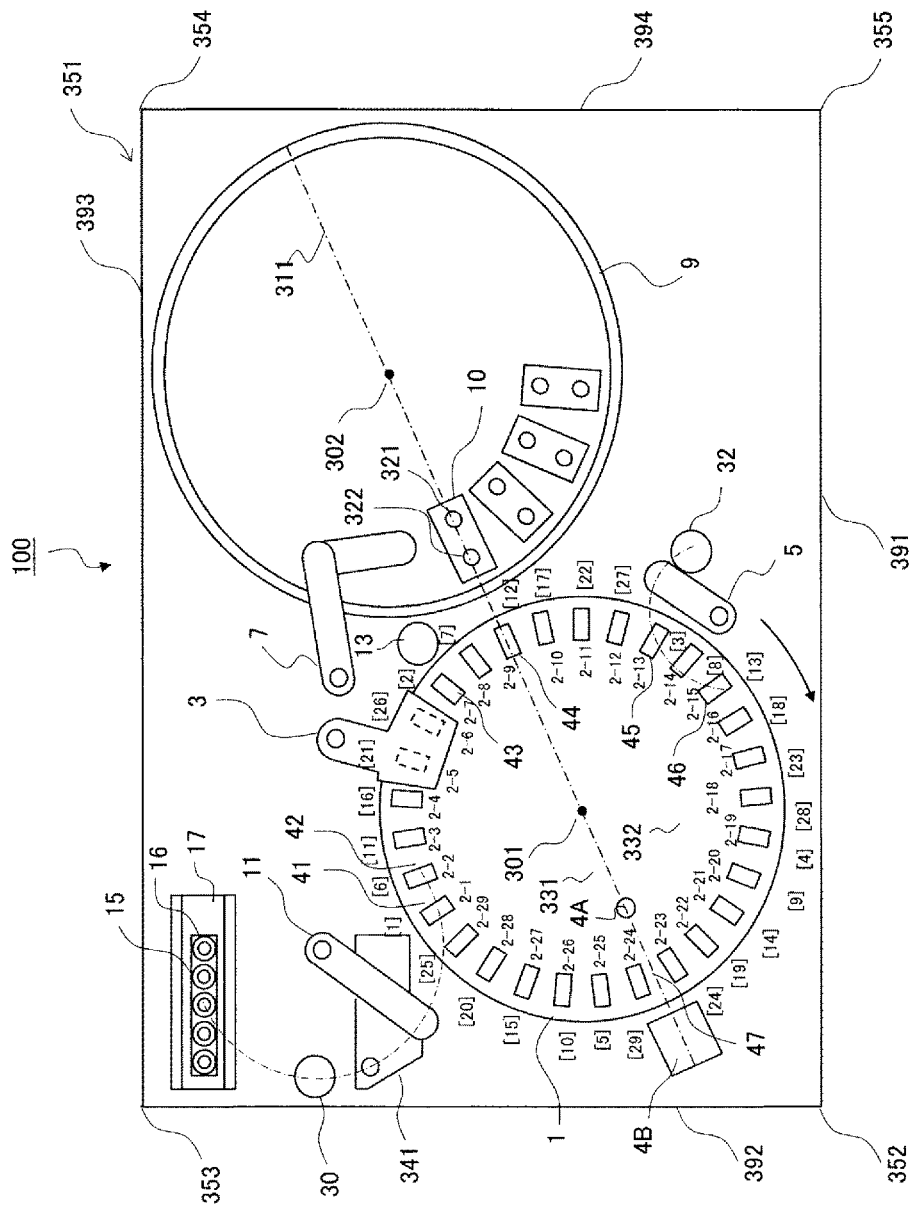
[FIG. 5]

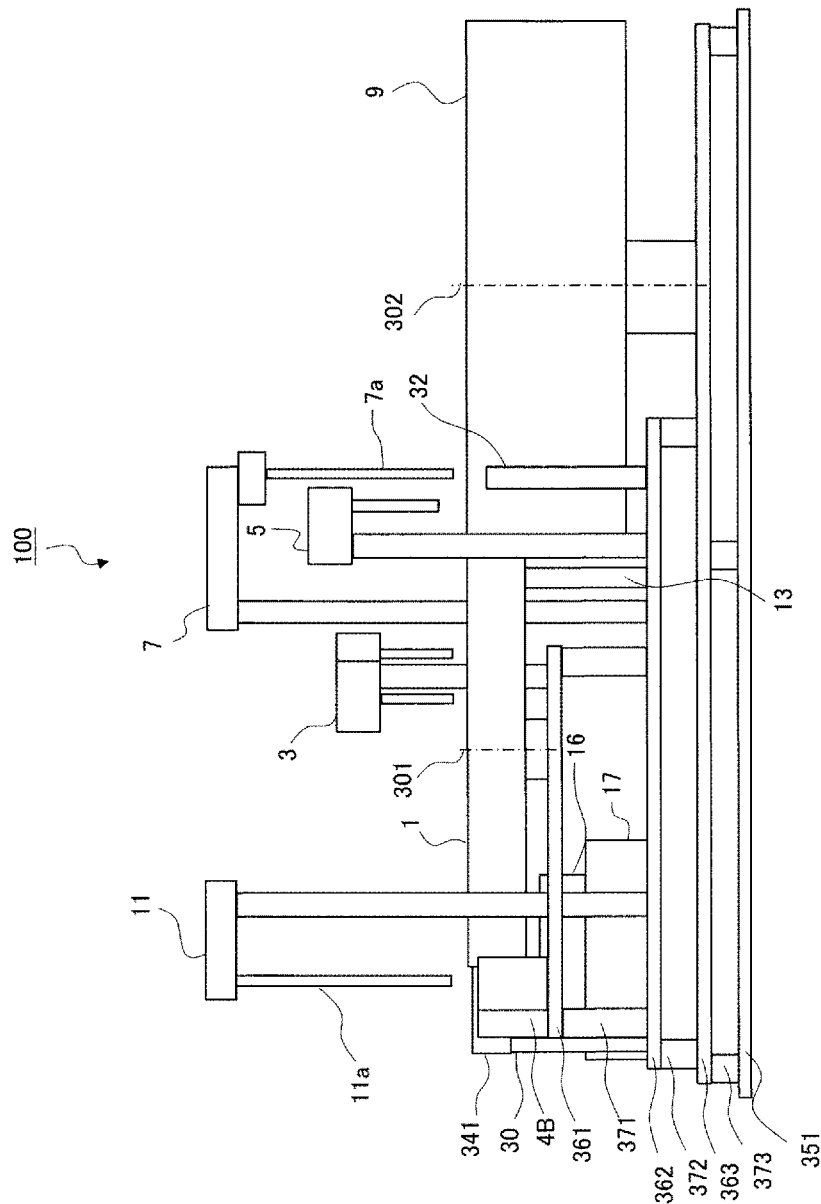
[FIG. 6]

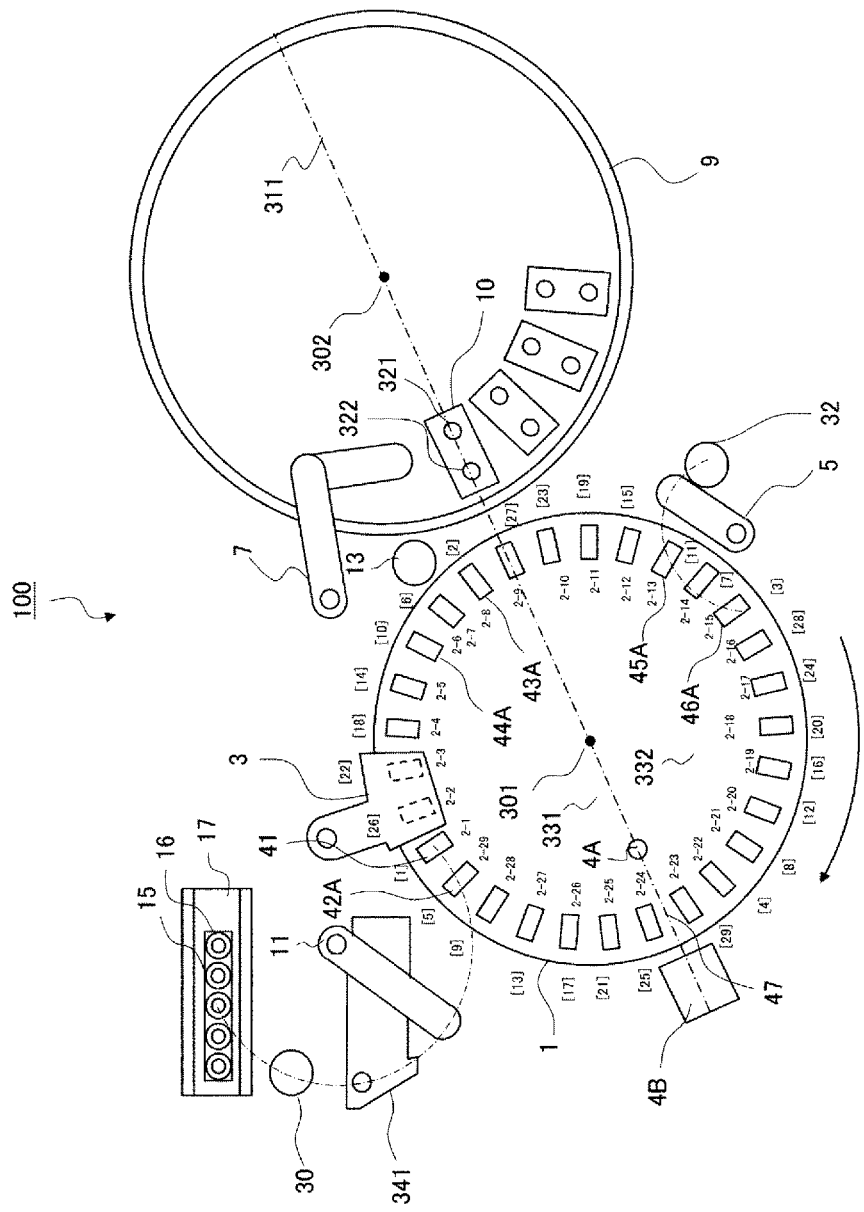
[FIG. 7]

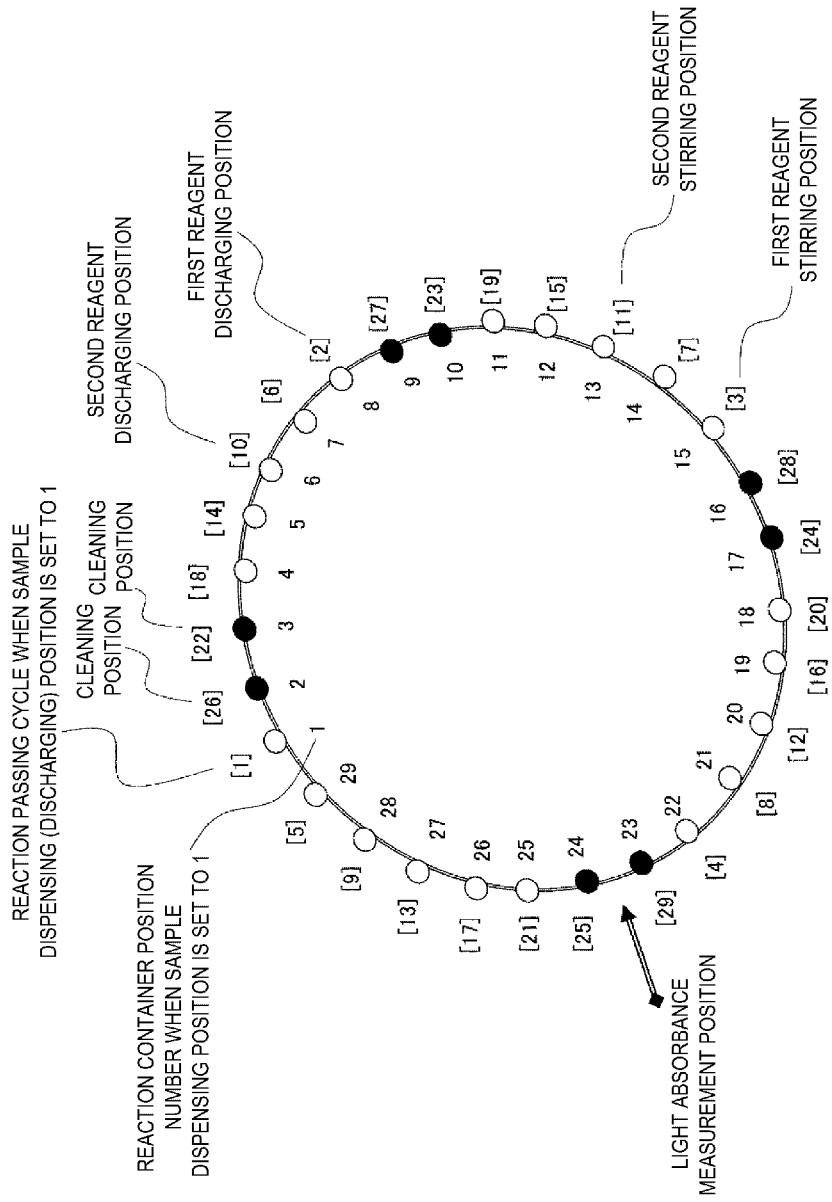

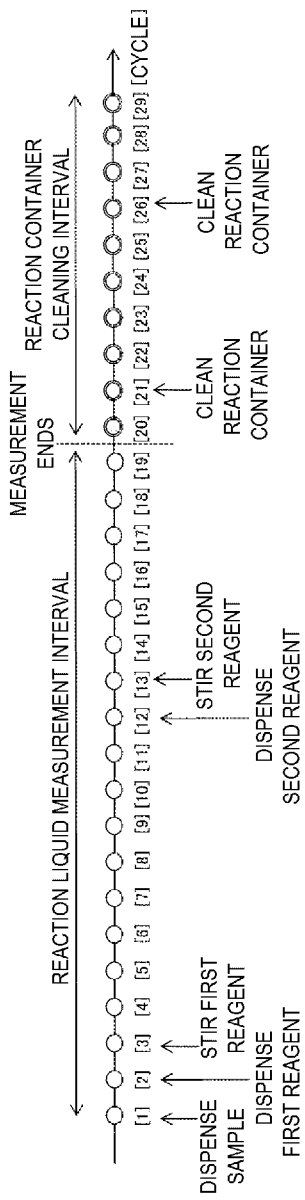
[FIG. 9]

AUTOMATIC ANALYSIS DEVICE

TECHNICAL FIELD

The invention relates to an automatic analysis device that analyzes a biological sample such as blood or urine.

BACKGROUND ART

As an example of an automatic analysis device that is compact, can analyze multiple types of items, and has high processing capacity and dispensing accuracy even when an item requiring dilution/pre-treatment and a general reaction measurement item are mixed, WO-A-2013-058170 (PTL 1) discloses an automatic analysis device including: a plurality of sample dispensing mechanisms that can be individually driven, each of the plurality of sample dispensing mechanisms including a sample collection position, a sample nozzle for collecting a sample, and a cleaning tank for cleaning the sample nozzle, collecting samples from a plurality of sample collection positions, and being independently operated and configured to perform sample dispensation with respect to the reaction containers on the reaction disk; at least one sample dispensing mechanism that is provided for each of a sample requiring dilution/pre-treatment and a sample not requiring dilution/pre-treatment; and control means for exclusively controlling each of the sample dispensing mechanisms to operate the sample dispensing mechanism. In the automatic analysis device, the sample is dispensed without creating vacancy in the reaction container.

CITATION LIST

Patent Literature

PTL 1: WO-A-2013-058170

SUMMARY OF INVENTION

Technical Problem

An automatic analysis device that quantitatively or qualitatively analyzes a specific component in a biological sample such as blood or urine and is essential in current diagnosis due to high reproducibility of the analysis result, a high processing speed, and the like.

"Sample" described in the present specification includes both of biological samples such as blood or urine of an inpatient or an outpatient and blood or urine of a subject in a medical check-up or the like.

A measurement method of the automatic analysis device is roughly divided into: an analysis method (colorimetric analysis) of using a reagent that reacts with an analysis target component in a sample such that the color of reaction liquid changes and measuring the change in color with a measurement unit; and an analysis method (immunological analysis) of counting markers using a reagent, the reagent obtained by adding a marker to a material that is specifically bonded directly or indirectly to a target component.

A general automatic analysis device that performs the colorimetric analysis is configured such that a reaction of a biological sample and a reagent is analyzed in a continuous and cyclic manner by repeating a rotation operation and a stop operation of a reaction disk including a plurality of reaction containers annularly arranged on a rotatable disk.

This automatic analysis device is required to be compact and to be capable of measuring multiple types of items.

The automatic analysis device includes not only a reaction disk but also at least one reagent disk where reagent containers containing a reagent for reacting with a biological sample are held, and the reaction disk and the reagent disk are arranged on a plane in many cases.

Recently, as the number of analysis items increases, the number of reagent containers provided in a reagent disk tends to increase. The number of the reaction containers provided in the reaction disk change depending on the processing capacity of the device per unit time. Therefore, the size of reaction disk depends on the processing capacity of the device.

Accordingly, when the reagent disk and the reaction disk are arranged on a plane, the reagent disk and the reaction disk account for most part of the area of the device.

In an actual automatic analysis device, the other units need to be arranged on the periphery of a reagent disk or a reaction disk, and the size of the device tends to increase depending on the layout of units. In order to prevent the size of the device from increasing, various methods are disclosed for the configuration of the device.

In the automatic analysis device, a plurality of reagent containers containing a reagent are kept cool at about 10 degrees in a reagent disk and are rotationally moved to a position where the reagent is suctioned. In addition, the reagent is suctioned from the reagent container by a reagent probe while the reaction disk is rotating, and the reagent is discharged into the reaction container while the reaction disk is stopped. In addition, a measurement unit provided around the reaction disk measures a color change of a reaction liquid in the reaction container that is passing through the front of the measurement unit during the rotation of the reaction disk that repeatedly moves and stops.

Here, in order to acquire a small color change of the reaction liquid, the measurement unit has a property of disliking disturbance noise such as electrical noise, mechanical vibration, or temperature change.

However, in the technique described in PTL 1, various movable devices such as the cleaning mechanism of the reaction container, the sample transport device, or the cleaning tank of the stirring device are arranged near the measurement unit, and it was clarified that there is a room for further reduction in the effect of the disturbance noise on the movable devices.

In addition, in the automatic analysis device, air taken from the front surface side of the device cools an internal device or a substrate and is exhausted from the back surface side.

However, in the technique described in PTL 1, in particular, in a configuration shown in FIG. 15 of PTL 1, the measurement unit is positioned on the device back surface side. In this layout, there is a concern where the measurement unit may be exposed to the air of which the temperature is increased after cooling the front surface side and being discharged, and the present inventors clarified that there is room for improvement in preventing the effect of the temperature change with a simpler configuration.

Further, in the configuration shown in FIG. 15 of PTL 1, most of regions (for example, dispensing nozzle replacement or a reaction disk) that a user frequently accesses during maintenance are arranged on the back surface side of the device. Therefore, it was clarified that there is room for further improvement in maintenance.

The invention provides an automatic analysis device with a structure in which a measurement unit is less susceptible to disturbance as compared to a device in the related art.

Solution to Problem

The invention include a plurality of means for achieving the above-described object, and one example thereof is an automatic analysis device for measuring properties of liquid where a sample is reacted with a reagent, including: a reaction disk that includes a plurality of reaction containers circumferentially arranged thereon, the reaction container being configured to react the sample with the reagent; a reagent disk that is configured to keep a plurality of reagent containers containing the reagent; a stirring mechanism that is configured to stir the liquid held in the reaction container; and a measurement unit that is configured to measure physical properties of the liquid held in the reaction container, in which when a housing constituting the automatic analysis device is viewed from a top side, the reaction disk is disposed on a first corner side that is one of two corners located at both ends of a first side on a front surface side of the housing to be accessed by a user, the reagent disk is disposed on a rear surface side of the housing facing the first side, and on a second corner side located diagonally to the first corner among two corners located on both ends of a second side, the measurement unit is disposed on a straight line passing through a rotation axis of the reagent disk and a rotation axis of the reaction disk and on the first corner side than the rotation axis of the reaction disk around the reaction disk, and when an orthogonal line passing through the rotation axis of the reaction disk and orthogonal to the straight line is drawn, the stirring mechanism and the cleaning mechanism are disposed on the reagent disk side of the orthogonal line.

Advantageous Effects of Invention

According to the invention, the measurement unit can be made to be less susceptible to disturbance as compared to a device in the related art. Objects, configurations, and effects other than those described above will be clarified by describing the following embodiment.

BRIEF DESCRIPTION OF DRAWINGS

FIG. 1 is an overall schematic configuration view of an automatic analysis device according to an embodiment of the invention.

FIG. 2 is a view showing an example of a spectrophotometer used in the automatic analysis device according to the embodiment of the invention.

FIG. 3 is a view for illustrating an arrangement of a plurality of reaction containers stored in a reaction disk and an arrangement of a reagent disk and a measurement unit, the reaction disk, the reagent disk and the measurement unit constituting the automatic analysis device according to the embodiment of the invention.

FIG. 4 is a view for illustrating details of the reaction disk in the automatic analysis device shown in FIG. 3.

FIG. 5 is a view for illustrating an arrangement, in a casing, of the reaction disk, the reagent disk, and the measurement unit constituting the automatic analysis device according to the embodiment of the invention.

FIG. 6 is a view for illustrating a configuration of a base constituting the automatic analysis device according to the embodiment of the invention.

FIG. 7 is a view for illustrating an arrangement of a plurality of reaction containers stored in a reaction disk and an arrangement of a reagent disk and a measurement unit, the reaction disk, the reagent disk and the measurement unit constituting an automatic analysis device according to another embodiment of the present invention.

FIG. 8 is a view for illustrating details of the reaction disk in the automatic analysis device shown in FIG. 7.

FIG. 9 is a diagram showing an analysis step in the automatic analysis device according to the embodiment of the invention.

DESCRIPTION OF EMBODIMENTS

An embodiment of an automatic analysis device according to the invention will be described using FIGS. 1 to 9.

First, a schematic overall configuration of the automatic analysis device according to the embodiment will be described using FIGS. 1 and 2. FIG. 1 is an overall schematic configuration view of the automatic analysis device according to the embodiment of the invention. In addition, FIG. 2 shows an example of a configuration of a spectrophotometer.

An automatic analysis device 100 shown in FIG. 1 is a device for measuring properties of liquid where a sample is reacted with a reagent, the automatic analysis device 100 mainly including a sample transport mechanism 17, a reaction disk 1, a reagent disk 9, a sample dispensing mechanism 11, a reagent dispensing mechanism 7, a stirring mechanism 5, a measurement unit, an electrolyte measurement unit 341, a cleaning mechanism 3, and a controller 21.

The sample transport mechanism 17 is a device that transports a rack 16 on which a plurality of sample containers 15 containing a sample are loaded to a desired dispensing position, the rack 16 being input from a sample rack input unit (not shown).

In the reaction disk 1, a plurality of reaction containers 2 for causing a sample and a reagent to react are stored in a state where they are separated from each other in a circumferential direction thereof (circumferentially) at predetermined intervals. The sample transport mechanism 17 to which the rack 16 containing the sample containers 15 are transported is provided near the reaction disk 1.

The reagent disk 9 is a storage where a plurality of reagent bottles 10 containing a reagent can be stored circumferentially. The reagent disk 9 is kept cool.

The sample dispensing mechanism 11 is provided between the reaction disk 1 and the sample transport mechanism 17 and is configured to be rotatable and vertically movable in an arc shape. At a tip of the sample dispensing mechanism 11, a sample nozzle 11a is provided. A pump for sample 18c is connected to the sample nozzle 11a, the sample nozzle 11a suctions a sample from the sample container 15 or the reaction container 2 while moving around a rotation axis of the sample dispensing mechanism 11 in an arc shape, and discharges the sample to another reaction container 2 on the reaction disk 1 to dispense the sample. Here, as the pump for sample 18c, for example, a syringe pump is used.

The reagent dispensing mechanism 7 is provided adjacent to the reaction disk 1 and the reagent disk 9 and is configured to be rotatable and vertically movable in an arc shape. At a tip of the reagent dispensing mechanism 7, a reagent nozzle 7a is provided. A pump for reagent 18a is connected to the reagent nozzle 7a. Here, as the pump for reagent 18a, for example, a syringe pump is used.

The stirring mechanism 5 includes, for example, a stirring blade or a spatula-shaped rod (not shown) provided at a tip, and the stirring blade or the bar is dipped in a reaction liquid as a mixed liquid of a sample and a reagent in the reaction container 2 and rotates the reaction liquid to stir the reaction liquid. The stirring mechanism 5 is not limited to this mechanism and can be configured with ultrasonic waves.

The measurement unit is a device that measures optical characteristics during or after a reaction of a reaction liquid 2A obtained by causing a sample and a reagent to react in the reaction container 2, the measurement unit including: a light source 4A that is arranged inside the reaction disk 1; and a spectrophotometer 4B that is arranged to face the light source 4A with respect to the reaction container 2.

More specifically, as shown in FIG. 2, the spectrophotometer 4B according to the embodiment is a device for detecting light that is emitted from the light source 4A to the reaction container 2 and transmits through the reaction liquid 2A held in the reaction container 2, the spectrophotometer 4B including condenser lenses 4B1 and 4B2, a slit 4B3, a concave diffraction grating 4B4, and a multi-wavelength detector 4B5.

In the spectrophotometer 4B, the light from the light source 4A is condensed by the condenser lens 4B1 and is emitted to the reaction liquid 2A in the reaction container 2. The transmitted light transmitted from the reaction liquid 2A is condensed on an opening portion of the slit 4B3 by the condenser lens 4B2. The light transmitted through the slit 4B3 is dispersed in wavelength by the concave diffraction grating 4B4 to form a spectrum. The formed spectrum is detected by the multi-wavelength detector 4B5 and is transmitted to the controller 21.

The measurement unit is not limited to the measurement of an absorbance by the spectrophotometer. For example, a detector that detects transmitted light or scattered light can be used.

The electrolyte measurement unit 341 is a measurement unit that measures the concentration of an electrolyte such as Na, K, or Cl in the sample using an ion selective electrode.

The cleaning mechanism 3 is a device that cleans the reaction container 2 after completion of measurement and is connected to a cleaning pump 20 and a vacuum pump 22.

In addition, a cleaning tank 13 for cleaning the reagent nozzle 7a of the reagent dispensing mechanism 7 is provided between the reaction disk 1 and the reagent disk 9. A cleaning tank 30 for cleaning the sample nozzle 11a of the sample dispensing mechanism 11 is provided between the reaction disk 1 and the sample transport mechanism 17.

Further, a cleaning tank 32 for cleaning the stirring blade or the spatula-shaped rod of the stirring mechanism 5 is provided between the reaction disk 1 and the stirring mechanism 5 to prevent contamination.

The controller 21 is connected to each of the mechanisms in the automatic analysis device 100 and controls an operation thereof. The controller 21 includes a user interface including an output unit (not shown) such as a printer or a display that displays an operation screen for ordering a measurement item to be measured for a sample to be measured or an operation screen for verifying the measurement result or an input unit (not shown) for inputting various instructions, and functions to integrally control information of all the units of the automatic analysis device.

This controller 21 is a computer including a CPU or a memory, controls various operations of the respective members, and executes arithmetic processing of acquiring the concentration of a predetermined component in the specimen based on the detection result of the spectrophotometer 4B. The control of the operations of the devices by the controller 21 is executed based on various programs stored in a storage unit (not shown).

The control processes of the operations executed by the controller 21 may be collectively executed by one program or may be executed individually by a plurality of programs, or a combination thereof may be adopted. In addition, some or all of the programs may be implemented by dedicated hardware or may be modularized.

Hereinabove, the overall configuration of the automatic analysis device 100 has been described.

As shown in FIG. 1, a case where the automatic analysis device includes the sample transport mechanism 17 that transports the rack 16 to a predetermined position will be described as an example, but the configuration of the sample transport mechanism is not limited thereto.

For example, a sample disk having a configuration where a plurality of sample containers 15 are stored in a circumferential direction (circumferentially) may also be used. In addition, the sample disk may have a disk shape where a plurality of sample containers 15 are stored concentrically on the inner circumferential side and the outer circumferential side in a circumferential direction.

In addition, a transport unit can be connected to the automatic analysis device 100, the transport unit inputting or collecting the rack 16 where one or more sample containers containing a biological sample such as blood or urine as an analysis target are stored into or from the automatic analysis device 100 and transporting the rack 16 to the automatic analysis device 100.

This transport unit is, for example, a unit for supplying the rack 16 to the sample transport mechanism 17 shown in FIG. 1 and includes, for example, an input unit of the rack 16, an urgent sample container input unit, a rack ID reading unit, a transport line, a rack standby disk, and a rack housing unit.

When this transport unit is provided, the automatic analysis device shown in FIG. 1 is connected to the transport unit. At this time, the device shown in FIG. 1 that performs biochemical analysis can be connected to one or more transport units. In addition to the analysis device that performs biochemical analysis, an analysis device that performs immunological analysis or the like can be connected to the transport unit.

The analysis process of the automatic analysis device 100 on the sample is generally performed in the following order.

First, the rack 16 is provided in the transport unit or the like and is transported up to a sample splitting position of the automatic analysis device 100 by the sample transport mechanism 17.

The rack 16 that arrives at the sample splitting position splits a sample into the reaction containers 2 of the reaction disk 1 by the sample dispensing mechanism 11. The sample is split a required number of times by the sample dispensing mechanism 11 depending on an analysis item requested for the sample.

In addition, a reagent used for the analysis is split by the reagent dispensing mechanism. 7 from the reagent bottles 10 on the reagent disk 9 into the reaction containers 2 into which the sample is previously split. Next, the reaction liquid 2A prepared by mixing the sample and the reagent in the reaction container 2 is stirred by the stirring mechanism 5.

Next, light emitted from the light source 4A is caused to transmit through the stirred reaction container 2 containing the reaction liquid 2A such that the light intensity of the transmitted light is measured by the spectrophotometer 4B. The light intensity measured by the spectrophotometer 4B is transmitted to the controller 21. By performing an operation with the controller 21 to acquire the concentration of a predetermined component in a liquid sample such as blood or urine, the result is displayed by a display device or the like or is stored in the storage unit.

Next, the details of an arrangement configuration of the respective units in the automatic analysis device 100 according to the embodiment will be described using FIGS. 3 to 9.

First, an example of a configuration of the reaction disk 1 and a method of operating the same will be described using FIGS. 3 and 4. FIG. 3 is a view showing an arrangement of a plurality of reaction containers stored in the reaction disk and an arrangement of the reagent disk and the measurement unit. FIG. 4 is a diagram showing the summary of the reaction disk 1 in FIG. 3.

As shown in FIG. 3, in the automatic analysis device 100 according to the embodiment, 29 reaction containers 2-1 to 2-29 are stored in the reaction disk 1 to be separated from each other at predetermined intervals in the circumferential direction (circumferentially).

In the present specification, when it is desired to describe a specific reaction container stored in the reaction disk 1, the specific reaction container is described as one of the reaction containers 2-1 to 2-29, and when it is desired to describe any reaction container or collectively describe the reaction containers, the reaction container is described as the reaction container 2.

The reaction disk 1 includes a first rotation axis 301 for rotationally moving the reaction containers 2 arranged circumferentially, is repeatedly rotated clockwise and stopped by an amount equivalent to six reaction containers 2 in one cycle as indicated by an arrow shown in FIG. 3, and is stopped at a position after being moved by an amount equivalent to 6×5=30 reaction containers 2 in 5 cycles.

That is, after 5 cycles, the reaction disk 1 is stopped at a position after being rotated once by an amount equivalent to the total number of the reaction containers 2 which is 29×one rotation+one reaction container 2=30 reaction containers 2, that is, by one rotation+one reaction container 2.

Here, one cycle is defined as a period of time for which, after the sample dispensing mechanism 11 dispenses a sample for measurement from the sample container 15 into one reaction container 2, the reaction disk 1 is rotated and stopped to dispense the sample to the next reaction container 2.

Accordingly, in the example shown in FIG. 3, a position where the sample is dispensed from the sample container 15 into the reaction container 2 by the sample dispensing mechanism 11 is a sample discharging position 41. Therefore, at the time after 5 cycles, the sample for measurement is dispensed from the sample container 15 into reaction containers 2-1, 2-24, 2-18, 2-12, and 2-6 by the sample dispensing mechanism 11. By repeating the above-described operation, the reaction container returns to the same position after 29 cycles.

In addition, the numbers in parentheses added to the outer circumferential side of the reaction disk 1 in FIG. 3, that is, [1] to [29] are the numbers representing positions where the reaction container 2-1 is stopped in cycles [1] to [29] when the reaction container 2-1 into which the sample is dispensed by the sample dispensing mechanism 11 at the sample discharging position 41 is the reaction container in the cycle [1]. A sample suction position 42 is a position where the pre-treated sample is suctioned from the reaction container 2 by the sample dispensing mechanism 11.

Further, a first reagent suction position 321, a second reagent suction position 322, a first reagent discharging position 43, and a second reagent discharging position 44 where a reagent is dispensed by the reagent dispensing mechanism 7, a first stirring position 45 where a reaction liquid which is a mixed liquid of a sample and a first reagent in the reaction container 2 after the first reagent discharge is stirred by the stirring mechanism 5, a second stirring position 46 where a reaction liquid which is a mixed liquid of a sample, the first reagent, and a second reagent in the reaction container 2 after the second reagent discharge is stirred by the stirring mechanism 5, and a light absorbance measurement position 47 where the absorbance of the reaction liquid is measured by the spectrophotometer 4B of the measurement unit are arranged.

Among these positions, the sample discharging position 41 or the sample suction position 42 is provided in a range where the reaction disk 1 is rotationally moved from the spectrophotometer 4B to the reagent disk 9 side. In addition, the first stirring position 45 or the second stirring position is provided in a range where the reaction disk 1 is rotationally moved from the reagent disk 9 to the spectrophotometer 4B side.

As shown in FIGS. 3 and 4, when the reaction container 2-1 is focused on, in the first cycle (cycle [1]), a predetermined amount of the sample is dispensed from the sample container 15 into the reaction container 2-1 by the sample dispensing mechanism 11.

In FIG. 4, the reaction container position number is set to 1 when the sample dispensing (discharging) position is set to 1, [1] represents a reaction passing cycle and the first cycle when the sample dispensing (discharging) position is set to 1.

Next, in the second cycle (cycle [2]), the reaction container 2-1 into which the predetermined amount of the sample is previously dispensed is moved to the first reagent discharging position 43, and a predetermined amount of the first reagent is dispensed into the reaction container 2-1 by the reagent dispensing mechanism 7.

In the third cycle (cycle [3]), the reaction container 2-1 containing the reaction liquid which is the mixed liquid of the sample and the first reagent is moved to the first stirring position 45, and the reaction liquid which is the mixed liquid of the sample and the first reagent in the reaction container 2-1 is stirred and mixed by the stirring mechanism 5. Next, the reaction container 2-1 moves to the fourth cycle (cycle [4]).

Next, while moving from the fourth cycle to the fifth cycle (cycle [5]), the reaction container 2-1 passes through the light absorbance measurement position 47. At this time, the absorbance of the light absorbance measurement position 47 is measured by the spectrophotometer 4B.

In the sixth cycle (cycle [6]), the reaction container 2-1 is moved to the sample suction position 42 and stopped.

Next, in the 12th cycle (cycle [12]), the reaction container 2-1 into which the predetermined amount of the sample is previously dispensed is moved to the second reagent discharging position 44, and a predetermined amount of the second reagent is dispensed into the reaction container 2-1 by the reagent dispensing mechanism 7.

In the 13th cycle (cycle [13]), the reaction container 2-1 containing the reaction liquid which is the mixed liquid of the sample and the second reagent is moved to the second stirring position 46. At the second stirring position 46, the reaction liquid which is the mixed liquid of the sample, the first reagent, and the second reagent in the reaction container 2-1 is stirred and mixed by the stirring mechanism 5. Next, the reaction container 2-1 moves to the 14th cycle (cycle [14]).

Subsequently, up to the 20th cycle (cycle [20]), when the reaction container 2-1 passes through the front of the light absorbance measurement position 47 of the spectrophotometer 4B, the absorbance is measured.

In the 21st cycle and the 26th cycle, the reaction container 2-1 is cleaned by the cleaning mechanism 3. Next, up to the 29th cycle (cycle [29]), the reaction container 2-1 is sequentially moved. Next, the reaction container 2-1 is moved again up to the first cycle (cycle [1]) which is the sample discharging position 41.

Here, in the automatic analysis device 100 according to the invention, the reagent disk 9 is arranged without overlapping the vicinity of the reaction disk 1 in the vertical direction. This reagent disk 9 includes a second rotation axis 302 for rotationally moving the reagent bottles 10 arranged circumferentially. In the invention, a line connecting the first rotation axis 301 of reaction disk 1 and the second rotation axis 302 of the reagent disk 9 will be referred to as a straight line 311.

In addition, the reagent dispensing mechanism 7 suctions the reagent from the first reagent suction position 321 or the second reagent suction position 322 of the reagent disk 9 and dispenses the reagent into the reaction container 2 stopped at the first reagent discharging position 43 or the second reagent discharging position 44.

Accordingly, when the reagent dispensing mechanism 7 is a mechanism that operates vertically and rotationally as in the embodiment, it is desired that the reagent dispensing mechanism 7 is positioned adjacent to the outer circumferences of the reaction disk 1 and the reagent disk 9. In addition, it is also desired that the cleaning tank 13 for cleaning the reagent nozzle 7a of the reagent dispensing mechanism 7 is positioned adjacent to the outer circumferences of the reaction disk 1 and the reagent disk 9.

In addition, it is desired that the moving distance of the reagent nozzle 7a is as short as possible from the viewpoint of reducing the size of the mechanism and improving the processing capacity. Accordingly, it is desired that the first reagent suction position 321 and the second reagent suction position 322 are positioned on the straight line 311 connecting the first rotation axis 301 of the reaction disk 1 and the second rotation axis 302 of the reagent disk 9.

Due to the same reason, it is desirable that the first reagent discharging position 43 or the second reagent discharging position 44 is positioned on the straight line 311 or the vicinity thereof, for example, in a range of about ±60° with respect to the straight line 311 from the first rotation axis 301 of the reaction disk 1 as the origin.

In addition, in the automatic analysis device 100 according to the embodiment, when the automatic analysis device 100 is seen from the upper surface side, the measurement unit is arranged on the straight line 311 connecting the first rotation axis 301 of the reaction disk 1 and the second rotation axis 302 of the reagent disk 9.

In the measurement unit, it is desirable that at least the spectrophotometer 4B is arranged on the straight line 311. In particular, it is preferable that the concave diffraction grating 4B4 and the multi-wavelength detector 4B5 among the units constituting the spectrophotometer 4B shown in FIG. 2 are arranged on the straight line 311. It is also desirable that the condenser lens 4B2 or the slit 4B3 is arranged on the straight line 311.

"Arranged on the straight line 311" only needs to satisfy a condition that at least a part of the target unit passes through the virtual straight line 311 when the automatic analysis device 100 is seen from the upper surface side, but desirably satisfies a condition that most part of the unit passes through the straight line 311.

Further, in the embodiment, the spectrophotometer 4B or the light source 4A is arranged such that the first rotation axis 301 of the reaction disk 1 is arranged between the second rotation axis 302 of the reagent disk 9 and the spectrophotometer 4B. In addition, the spectrophotometer 4B is arranged around the reaction disk 1.

This way, by arranging the second rotation axis 302 of the reagent disk 9 and the spectrophotometer 4B to be symmetrical to each other with respect to the first rotation axis 301 of the reaction disk 1, the spectrophotometer 4B can be separated from disturbance noise such as electrical noise generated by the reagent disk 9 or the reagent dispensing mechanism 7, mechanical vibration, or temperature change as far as possible.

The temperature of the reaction disk 1 is controlled. In order to avoid a temperature change, it is desirable that the spectrophotometer 4B has the same temperature as the reaction disk 1. Therefore, by arranging the spectrophotometer 4B around the reaction disk 1, the measurement can be performed more stably and accurately.

In addition, the measurement unit, in particular, the spectrophotometer 4B is arranged on the front surface side that a user of the automatic analysis device 100 accesses and arranged on the lower side in FIG. 3 or 5.

Further, in order to avoid noise generated by vibration at the time of start and stop of the rotation operation of the reaction disk 1, it is desirable that the light absorbance measurement position 47 is a position where the reaction container 2 is stopped in the 20th or subsequent cycle (cycle [20]) during or after cleaning where the cleaning is performed by the cleaning mechanism 3 after completion of the measurement of the absorbance.

In the example of FIG. 3, the light absorbance measurement position 47 is provided between the reaction container 2 in the 24th cycle (cycle [24]) and the reaction container 2 in the 29th cycle (cycle [29]).

In FIG. 3, the light absorbance measurement position 47 is arranged on the straight line 311. However, the light absorbance measurement position 47 can be arranged in the vicinity of the straight line 311.

As described above, when the first rotation axis 301, the second rotation axis 302, and the measurement unit are positioned on the straight line 311 and the second rotation axis 302 and the measurement unit are arranged to be symmetrical to each other with respect to the first rotation axis 301, a large region for providing mechanism can be secured on both sides of two semicircles 331 and 332 formed by the straight line 311 in the vicinity of the reaction disk 1.

The automatic analysis device shown in FIG. 3 can be considered, in which the sample dispensing mechanism 11 dispenses the sample for measurement into the reaction container 2, the reagent dispensing mechanism 7 dispenses the reagent for measurement into the reaction container, and the stirring mechanism 5 stirs the reaction liquid which is the mixed liquid of the sample and the reagent.

In this device configuration, when the reaction disk 1 rotates clockwise, it is desirable that the sample dispensing mechanism 11, the sample discharging position 41, the rack 16 on which a plurality of sample containers 15 containing a sample are loaded, and the sample transport mechanism 17 that transports the rack 16 to a desired position are positioned on the semicircle 331 where the reaction disk 1 is rotationally moved from the spectrophotometer 4B to the reagent disk 9 side from the viewpoint of adding a reagent immediately after adding the sample to the reaction container 2.

In addition, the reaction of the sample and the reagent starts after adding the reagent to the sample of the reaction container 2. In this case, for the uniform reaction, it is desirable that the sample and the reagent in the reaction container 2 are stirred as early as possible. Therefore, when the reaction disk 1 rotates clockwise, it is desirable that the stirring mechanism 5 is positioned on the semicircle 332 where the reaction disk 1 is rotationally moved from the reagent disk 9 to the spectrophotometer 4B side.

The cleaning mechanism 3 may clean any of the reaction containers in the 20th and subsequent cycles (cycle [20] and subsequent cycles). Therefore, the cleaning mechanism 3 may be arranged at an appropriate position among both sides of two the semicircles 331 and 332.

In addition, when the electrolyte measurement unit 341 is provided, the sample dispensing mechanism 11 needs to directly dispense the sample for measurement into the electrolyte measurement unit 341. Therefore, it is desirable that the electrolyte measurement unit 341 is positioned on the semicircle 331 side.

As described above, the spectrophotometer 4B is positioned on the straight line 311 connecting the first rotation axis 301 of the reaction disk 1 and the second rotation axis 302 of the reagent disk 9, and the second rotation axis 302 of the reagent disk 9 and the spectrophotometer 4B are arranged to be symmetrical to each other with respect to the first rotation axis 301 of the reaction disk 1. As a result, in the reaction disk 1, a large region for providing mechanism can be secured on both sides of the two semicircles 331 and 332 formed by the straight line 311, and the arrangement of the mechanisms can be optimized.

FIG. 5 shows one embodiment where the respective units of the automatic analysis device 100 having the configuration shown in FIG. 3 are compactly arranged in a casing 351.

When the casing 351 constituting the automatic analysis device 100 is seen from the upper surface side, the casing 351 has a rectangular shape having four sides 391, 392, 393, and 394, in which a first corner 352, a second corner 353, a third corner 354, and a fourth corner 355 are present.

When the automatic analysis device 100 having a circular mechanism such as the reaction disk 1 or the reagent disk 9 is stored in the casing 351, the sides of the casing are formed to be concentrically circumscribed to the circular mechanism. As a result, the footprint can be reduced. At this time, a corner of the casing 351 that is formed by two sides concentrically circumscribed to the circular mechanism is an isolated region. Therefore, it is difficult to arrange a mechanism in this corner, and the corner is likely to be a dead space.

However, in order to reduce noise received from another mechanism, it is desired to isolate the spectrophotometer 4B.

Therefore, when the automatic analysis device 100 is seen from the upper surface side, it is desirable that the spectrophotometer 4B is arranged, for example, on the periphery of the first corner 352 among the four sides of the casing 351.

In this case, the spectrophotometer 4B is positioned on the straight line 311 connecting the first rotation axis 301 of the reaction disk 1 and the second rotation axis 302 of the reagent disk 9, and the second rotation axis 302 of the reagent disk 9 and the spectrophotometer 4B are arranged to be symmetrical to each other with respect to the first rotation axis 301 of the reaction disk 1. Therefore, when the automatic analysis device 100 is seen from the upper surface side, it is desirable that the reagent disk 9 is arranged on the third corner 354 side diagonal to the first corner 352.

In order to adopt the arrangement relationship and avoid an increase in the size of the device, it is desirable that the straight line 311 is neither parallel nor perpendicular to any of the four sides 391, 392, 393, and 394 of the casing 351 as shown in FIG. 5.

In this way, the two circular mechanisms such as the reaction disk 1 and the reagent disk 9 are stored in the quadrangular casing 351. As a result, a dead space can be effectively utilized, and compact design can be made. In addition, a large region can be secured in the vicinity of the second corner 353 or the fourth corner 355. Therefore, another mechanism can be arranged without difficulty.

FIG. 6 shows a cross-section when the automatic analysis device 100 is seen from the side surface.

As shown in FIG. 6, in the automatic analysis device 100 according to the embodiment, the reaction disk 1 and the spectrophotometer 4B are fixed to the same first base 361.

In addition, examples of a mechanism fixed to the first base 361 include a mechanism that is stopped at a timing where the measurement is performed by the spectrophotometer 4B and operates at a timing other than the measurement timing.

For example, the cleaning mechanism 3 cleans the reaction container while the reaction disk 1 is stopped. Therefore, the cleaning mechanism 3 does not operate while the absorbance of the reaction disk 1 that is rotating is being measured by the spectrophotometer 4B. Therefore, there is no hindrance even when the cleaning mechanism 3 is fixed to the first base 361. Therefore, the cleaning mechanism 3 can be fixed to the first base 361 but may be fixed to a second base 362.

In addition, as shown in FIG. 6, the sample transport mechanism 17, the sample dispensing mechanism 11, the electrolyte measurement unit 341, the reagent dispensing mechanism 7, and the stirring mechanism 5 are fixed to the second base 362 different from the first base 361.

Further, the reagent disk 9 that is basically large-sized and rotationally driven is fixed to a third base 363 different from the first base 361 and the second base 362.

Examples of a mechanism fixed to the second base 362 or the third base 363 include a mechanism that basically operates at a timing where the measurement is performed by the spectrophotometer 4B.

The first base 361 and the second base 362 are connected to each other through a plurality of pillars 371. In addition, the second base 362 is fixed to the third base 363 through a plurality of pillars 372. Therefore, the first base 361 and the third base 363 are connected across the second base 362. Further, the third base 363 is connected to the casing 351 through a plurality of pillars 373.

A configuration may be adopted in which, without using the third base 363 and the pillars 373, the reagent disk 9 is fixed to the casing 351 and the second base 362 is fixed to the casing 351 through the plurality of pillars 372. In addition, a configuration can be adopted in which, without using the third base 363 and the pillars 373, the reagent disk 9 is fixed to the second base 362 and the second base 362 is directly fixed to the casing 351 through the plurality of pillars 372.

In addition, in the case of an automatic analysis device having a relatively low processing capacity and a small device size, a configuration may be adopted in which all the mechanisms are fixed to the first base 361 and the first base 361 is fixed to the casing 351 through the plurality of pillars 371.

In general, in the automatic analysis device, in order to perform analysis in a cyclic manner, the reaction disk 1 is rotationally driven by, for example, a stepping motor or a pulse motor (not shown).

When a total number of the reaction containers 2 stored in the reaction disk 1 is set to N, the reaction disk 1 moves by C (C≥1) rotations±a movement amount equivalent to one reaction container after B (B≥1) cycles, and the number of the reaction containers 2 by which the reaction disk 1 moves in one cycle is set to A (N+1≥A), the controller 21 outputs a control signal (control command) to a driving system of the reaction disk 1 to rotationally drive the reaction disk 1 such that a relationship of A×B=N×C±1 is satisfied and the reaction container 2 moves in one cycle by A reaction containers 2, in other words, the number of pitches per cycle is A. The total number N of the reaction containers 2 and the number A of the reaction containers 2 by which the reaction disk 1 moves in one cycle are mutually prime, and B and C are mutually prime.

In FIG. 3, the total number N of the reaction containers 2 stored in the reaction disk 1 is 29, the number A (N+1≥A) of the reaction containers 2 by which the reaction disk 1 moves in one cycle is 6, the reaction disk 1 moves by C (C≥1) rotations±a movement amount equivalent to one reaction container after B (B≥1) cycles, and the relationship of A×B=N×C±1 is satisfied, and N and A are mutually prime, and B and C are mutually prime.

The reaction containers 2-1 are divided by B based on the stop positions thereof. In FIG. 3, it can be seen that, since the number B of cycles is B is 5 as an example of an odd number, the reaction containers 2-1 are divided by 5, and the reaction containers 2 are arranged adjacent to each other counterclockwise on a five cycle basis from the reaction containers 2-1 of the cycles [1] to [5] (the first to fifth cycles).

Hereinafter, the fact that an odd number is more desirable than an even number as B (B≥1) will be described using FIGS. 7 and 8. FIG. 7 is a view showing an arrangement of a plurality of reaction containers stored in the reaction disk and an arrangement of the reagent disk and the measurement unit when B represents an even number (4). FIG. 8 is a diagram showing the summary of the reaction disk 1 in FIG. 7.

As in FIG. 3 or the like, FIGS. 7 and 8 do not show the controller 21 shown in FIG. 1.

As described above, in the automatic analysis device 100 according to the embodiment, 29 reaction containers 2-1 to 2-29 are stored.

As shown in FIG. 7, the reaction disk 1 includes the first rotation axis 301 for rotationally moving the reaction containers 2 arranged circumferentially, is repeatedly rotated clockwise and stopped by an amount equivalent to seven reaction containers 2 in one cycle as indicated by an arrow, and is stopped at a position after being moved by an amount equivalent to 7×4=28 reaction containers 2 in 4 cycles. That is, after 4 cycles, the reaction disk 1 is stopped at a position after being rotated once by an amount equivalent to the total number of the reaction containers 2 which is 29×one rotation−one reaction container 2=28 reaction containers 2, that is, by one rotation−one reaction container 2.

Accordingly, in FIG. 7, from the sample discharging position 41, the sample for measurement is dispensed from the sample container 15 into reaction containers 2-1, 2-23, 2-16, and 2-9 by the sample dispensing mechanism 11 at the time after 4 cycles. By repeating the above-described operation, the reaction container returns to the same position after 29 cycles.

In FIG. 7, likewise, the numbers in parentheses added to the outer circumferential side of the reaction disk 1, that is, [1] to [29] are the numbers representing positions where the reaction container 2-1 is stopped in cycles [1] to [29] when the reaction container 2-1 into which the sample is dispensed by the sample dispensing mechanism 11 at the sample discharging position 41 is the reaction container in the cycle [1].

A sample suction position 42A is a position where the pre-treated sample is suctioned from the reaction container 2 by the sample dispensing mechanism 11, and the first reagent suction position 321, the second reagent suction position 322, a first reagent discharging position 43A, and a second reagent discharging position 44A where the reagent is dispensed by the reagent dispensing mechanism 7, a first stirring position 45A, a second stirring position 46A, and the light absorbance measurement position 47 are arranged.

As shown in FIGS. 7 and 8, when the reaction container 2-1 is focused on, in the first cycle (cycle [1]), a predetermined amount of the sample is dispensed from the sample container 15 into the reaction container 2-1 by the sample dispensing mechanism 11.

Next, in the second cycle (cycle [2]), the reaction container 2-1 into which the predetermined amount of the sample is previously dispensed is moved to the first reagent discharging position 43A, and a predetermined amount of the first reagent is dispensed into the reaction container 2-1 by the reagent dispensing mechanism 7.

In the third cycle (cycle [3]), the reaction container 2-1 containing the reaction liquid which is the mixed liquid of the sample and the first reagent is moved to the first stirring position 45A. At the first stirring position 45A, the reaction liquid which is the mixed liquid of the sample and the first reagent in the reaction container 2-1 is stirred and mixed by the stirring mechanism 5. Next, the reaction container 2-1 moves to the fourth cycle (cycle [4]).

Next, while moving to the fifth cycle (cycle [5]), the reaction container 2-1 passes through the light absorbance measurement position 47. At this time, the absorbance of the light absorbance measurement position 47 is measured by the spectrophotometer 4B, and the reaction container 2-1 is moved up to the sample suction position 42A and stopped.

Next, in the tenth cycle (cycle [10]), the reaction container 2-1 into which the predetermined amount of the sample is previously dispensed is moved to the second reagent discharging position 44A, and a predetermined amount of the second reagent is dispensed into the reaction container 2-1 by the reagent dispensing mechanism 7.

In the 11th cycle (cycle [11]), the reaction container 2-1 containing the reaction liquid which is the mixed liquid of the sample and the second reagent is moved to the second stirring position 46A. At the second stirring position 46A, the reaction liquid which is the mixed liquid of the sample, the first reagent, and the second reagent in the reaction container 2-1 is stirred and mixed by the stirring mechanism 5. Next, the reaction container 2-1 moves to the 12th cycle (cycle [12]).

Subsequently, up to the 22nd cycle (cycle [22]), when the reaction container 2-1 passes through the front of the light absorbance measurement position 47 of the spectrophotometer 4B, the absorbance is measured. In the 22nd cycle and the 26th cycle, the reaction container 2-1 is cleaned by the cleaning mechanism 3. Next, up to the 29th cycle (cycle [29]), the reaction container 2-1 is sequentially moved. Next, the reaction container 2-1 is moved again up to the first cycle (cycle [1]) which is the sample discharging position 41.

In the configuration shown in FIG. 7, it is desirable that the first reagent discharging position 43A or the second reagent discharging position 44A is positioned on the straight line 311 or the vicinity thereof, for example, in a range of about ±60° with respect to the straight line 311 from the first rotation axis 301 of the reaction disk 1 as the origin.

However, when B (B≥1) represents an even number, the reaction containers 2-1 are divided by B based on the stop positions thereof. In FIG. 4, it can be seen that, since the number B of cycles is B is 4, the reaction containers 2-1 are divided by 4, and the reaction containers 2 are arranged adjacent to each other counterclockwise on a four cycle basis from the reaction containers 2-1 of the first to fourth cycles.

Therefore, in order to avoid noise generated by vibration at the time of start and stop of the rotation operation of the reaction disk 1, when the light absorbance measurement position 47 is provided between the reaction containers 2 at positions (the 25th cycle and the 29th cycle) at which the reaction containers 2 are stopped after the 22nd cycle where cleaning by the cleaning mechanism 3 can start after completion of the measurement of the absorbance, the measurement is already completed at a position where the reaction disk 1 and the reagent disk 9 are adjacent to each other, and the reaction containers of the 23rd cycle and the 27th cycle where the reagent does not need to be added are stopped.

This way, when B (B≥1) represents an even number, the reaction container that can start to be cleaned by the cleaning mechanism 3 is stuck in the vicinity of the straight line 311. Therefore, it is desirable that B (B≥1) represents an odd number such that the reaction container 2 that is being measured and to which the reagent can be added is arranged in the vicinity of the straight line 311 on the reagent disk 9 side.

Next, an analysis step that is performed in each cycle will be described.

A dispensing amount (liquid amount) of a sample corresponding to the type of a reagent and an analysis item from the controller 21 is dispensed into the reaction container 2 that is stopped at the sample discharging position 41 by the sample dispensing mechanism 11 in the first cycle as shown in FIG. 9, for example, into the reaction container 2-1 in FIG. 3.

After completion of the sample dispensing, the reaction disk 1 is moved clockwise by six reaction containers 2 based on a control signal (control command) from the controller 21 and is stopped at the first reagent discharging position 43.

In the second cycle, the reagent dispensing mechanism 7 suctions a dispensing amount (liquid amount) of the first reagent corresponding to the analysis item from the controller 21 from the reagent bottle 10 stored in the reagent disk 9. The reagent dispensing mechanism 7 discharges the first reagent into the reaction container 2-1 positioned at the first reagent discharging position 43.

After the reagent discharging, the reaction disk 1 is moved clockwise by six reaction containers 2 based on a control signal (control command) from the controller 21 and is stopped at the first stirring position 45.

In the third cycle, the sample and the first reagent in the reaction container 2-1 stopped at the first stirring position 45 are stirred based on a predetermined stirring intensity from the controller 21. After the stirring, the reaction disk 1 is moved clockwise by six reaction containers based on a control signal (control command) from the controller 21.

In the fifth cycle, the reaction container 2-1 passes through the light absorbance measurement position 47 where the spectrophotometer 4B is provided, the absorbance of the reaction liquid which is the mixed liquid of the sample and the first reagent is measured, and the measured value of the absorbance is stored in a predetermined storage area of the storage unit constituting the controller 21.

In the subsequent cycle, whenever the reaction container 2-1 passes through the light absorbance measurement position 47, the measured value of the absorbance of the reaction liquid is stored in the storage unit of the controller 21.

The reaction disk 1 is repeatedly rotated and stopped, and the reaction container 2-1 is stopped at the sample suction position 42 adjacent to the sample discharging position 41 in the sixth cycle.

Here, when the analysis item requires a pre-treatment of blood cell or the like before measurement, for example, in the measurement of hemoglobin A1c, the sample dispensing mechanism 11 suctions a pre-treated sample from the sample suction position 42 and discharges the pre-treated sample into the reaction container 2-29 stopped at the adjacent sample discharging position 41 such that the pre-treated sample can be analyzed.

On the other hand, in an analysis item where the sample does not require a pre-treatment and the second reagent does not need to be added, the reaction container 2-1 is stopped at the second reagent discharging position 44 in the 12th cycle. The reagent dispensing mechanism 7 suctions a dispensing amount (liquid amount) of the second reagent from the reagent bottle 10 in the reagent disk 9 and discharges the second reagent into the reaction container 2-1 positioned at the second reagent discharging position 44.

After the second reagent discharging, in the 13th cycle, the reaction disk 1 is moved clockwise by six reaction containers 2 based on a control signal (control command) from the controller 21 and is stopped at the second stirring position 46. The stirring mechanism 5 stirs the sample, the first reagent, and the second reagent in the reaction container 2-1 positioned at the second stirring position 46 based on a predetermined stirring intensity. After the stirring, the reaction disk 1 is moved clockwise by six reaction containers 2 based on a control signal from the controller 21.

The analysis is completed in the 20th cycle. After the 21st cycle, the measurement is not performed by the spectrophotometer 4B, and the reaction container 2-1 can be cleaned.

Next, the effect of the embodiment will be described.

The automatic analysis device 100 according to the embodiment includes: the reaction disk 1 that includes a plurality of reaction containers 2 circumferentially arranged thereon, the reaction container 2 being configured to react the sample with the reagent; the reagent disk 9 that is configured to keep a plurality of reagent bottles 10 containing the reagent; and the measurement unit that is configured to measure physical properties of the liquid held in the reaction container 2, in which the first rotation axis 301 of the reaction disk 1, the second rotation axis 302 of the reagent disk 9, and the measurement unit are arranged on the same straight line 311 when the automatic analysis device 100 is viewed from the upper surface side, the first rotation axis 301 of the reaction disk 1 is arranged between the second rotation axis 302 of the reagent disk 9 and the measurement unit, and the measurement unit is arranged on a front surface side to be accessed by a user of the automatic analysis device 100.

As a result, the measurement unit can be separated from the reagent disk 9 as far as possible, and an effect of disturbance noise such as electrical noise generated from the reagent disk 9 or a mechanism attached thereto, mechanical vibration, or temperature change on the measurement unit can be further reduced as compared to that in the related art.

In addition, in a state where the arrangement of the reaction disk 1 or the reagent disk 9 and the measurement unit is restricted, the measurement unit is arranged on the front surface to be accessed by the user of the automatic analysis device 100. As a result, the measurement unit can be prevented from being affected by a temperature change caused by exhaust heat with the simple configuration, and more stable analysis can be implemented.

Further, the reaction disk is divided into two equal regions by the straight line 311 connecting the first rotation axis 301 of the reaction disk 1, the second rotation axis 302 of the reagent disk 9, and the measurement unit, and a large space can be secured in both of the regions. The respective mechanisms required for the analysis, for example, the sample dispensing mechanism 11, the sample transport mechanism 17, or the reagent dispensing mechanism 7 can be arranged without difficulty.

In addition, a region (for example, dispensing nozzle replacement or a reaction disk) that a user frequently accesses during maintenance is arranged on a region closer to the front surface side of the device rather than the back surface side. Therefore, the effect that the maintenance can be performed more easily can also be exhibited.

In addition, the straight line 311 is neither parallel nor perpendicular to any of the sides 391, 392, 393, and 394 of the casing 351 that constitutes the automatic analysis device 100. Therefore, the reagent disk 9 or the reaction disk 1 that accounts for a large area in terms of the size can be efficiently arranged in the device, and the device can be made more compact.

Further, the measurement unit includes the slit 4B3 that is configured to diffract light passing through the reaction liquid 2A in the reaction container 2, the concave diffraction grating 4B4 that is configured to disperse light passing through the slit 4B3, and the multi-wavelength detector 4B5 that is configured to detect the light dispersed by the concave diffraction grating 4B4, and at least the concave diffraction grating 4B4 and the multi-wavelength detector 4B5 are arranged on the straight line 311. As a result, in the measurement unit, an analog portion having the highest effect on the measurement can be arranged to be separated from the reagent disk 9 or the like. Therefore, a configuration that is stronger to disturbance noise can be implemented.

In addition, the measurement unit is arranged on a periphery of the first corner 352 of the outer periphery of the device when the automatic analysis device 100 is viewed from the upper surface side. As a result, the measurement unit that is desired to be isolated can be arranged at a corner portion that is strongly held by the two sides 391 and 392, and an arrangement configuration that is stronger to disturbance noise such as vibration can be implemented.

Further, the reagent disk 9 is arranged on a periphery of the third corner 354 of the outer periphery of the device, that is different from the first corner 352, when the automatic analysis device 100 is viewed from the upper surface side. In particular, the first corner 352 and the third corner 354 are positioned at diagonal corners of the device.

In this arrangement, the reagent disk 9 can also be arranged at a corner portion that is strongly held by the two sides 393 and 394, and an arrangement configuration that is stronger to disturbance noise such as vibration can be implemented. Further, the spectrophotometer 4B and the reagent disk 9 can be arranged in a dead space of the device, and an increase in unnecessary device area can be reliably prevented.

That is, a general automatic analysis device is quadrangular, and the spectrophotometer 4B, the reaction disk 1, and the reagent disk 9 are arranged on one diagonal line. Therefore, a large space can be secured in another diagonal area, and the sample dispensing mechanism 11, the sample transport mechanism 17, the reagent dispensing mechanism 7, the stirring mechanism 5, the cleaning mechanism 3, the electrolyte measurement unit 341, and the like can be arranged on the periphery of the reaction disk 1 without increasing the size of the device.

Further, the reagent dispensing mechanism 7 is arranged at a position adjacent to outer peripheries of the reaction disk 1 and the reagent disk 9. As a result, a movable range of the reagent nozzle 7a can be reliably suppressed from increasing more than necessary, and a reduction in the size of the mechanism and improvement of the processing capacity can be reliably implemented.

In addition, in the reaction containers 2 of the reaction disk 1 stopped during dispensing of the sample by the sample dispensing mechanism 11 or during dispensing of the reagent by the reagent dispensing mechanism 7, a reaction container arranged at a position closest to the measurement position of the measurement unit is the reaction container 2 during or after cleaning by the cleaning mechanism 3. As a result, the reaction container that passes through the light absorbance measurement position 47 at an initial accelerating stage of the rotational movement of the reaction disk 1 or immediately before the stop of the rotational movement can be prevented from affecting the measurement. Therefore, factors that affect the analysis can be reduced, and the improvement of the analysis accuracy can be reliably implemented.

Further, the first reagent suction position 321 and the second reagent suction position 322 are arranged on the straight line 311. As a result, a movable range of the reagent nozzle 7a can be more reliably suppressed from increasing more than necessary, and a reduction in the size of the mechanism and improvement of the processing capacity can be reliably implemented.

In addition, the sample discharging position 41 or the sample suction position 42 of the sample dispensing mechanism 11 is set while the reaction disk 1 is rotationally moved from the measurement unit to the reagent disk 9 side. As a result, the reagent can be added to the reaction container 2 immediately after the sample is added to the reaction container 2, and the reaction can be efficiently performed, which can contribute to an increase in analysis speed.

Further, the first stirring position 45 or the second stirring position 46 of the stirring mechanism 5 is set while the reaction disk 1 is rotationally moved from the reagent disk 9 to the measurement unit side. As a result, immediately after the reagent is added, the reaction container can be moved to the stirring position, and thus the reaction can also be efficiently performed.

In addition, when a total number of the reaction containers 2 is set to N, the number of the reaction containers 2 by which the reaction disk 1 moves in one cycle is set to A (N+1≥A), and after B (B≥1) cycles, the reaction disk 1 is set to rotationally move by C (C≥1) rotations±a movement amount equivalent to one reaction container 2, the N and the A are mutually prime, the B and the C are mutually prime, the B is an odd number, and the reaction disk 1 is rotationally controlled such that the reaction container 2 moves by an amount A in the circumferential direction in one cycle so as to satisfy a relationship of A×B=N×C±1.

In this case, the reaction container 2 that is being measured can be arranged at the second reagent discharging position 44 where the reagent can be added, and thus the moving distance of the reagent nozzle 7a can be reduced as far as possible.

Further, the reaction disk 1 and the measurement unit are fixed to the same first base 361. As a result, the respective mechanisms do not need to be arranged in different bases more than necessary, and an increase in the size of the device can be reliably suppressed.

In addition, the automatic analysis device 100 further includes the sample dispensing mechanism 11 that is configured to dispense the sample into the reaction containers 2, the reagent dispensing mechanism 7 that is configured to dispense the reagent into the reaction containers 2, and the stirring mechanism 5 that is configured to stir the liquid, in which the sample dispensing mechanism 11, the reagent dispensing mechanism 7, and the stirring mechanism 5 are fixed to the second base 362 that is different from the first base 361. As a result, the reaction disk 1 and the spectrophotometer 4B can be fixed to another base different from that of another mechanism, and noise generated by direct electricity, mechanical vibration, or temperature change on the reaction disk 1 and the spectrophotometer 4B can be reduced.

Further, the reagent disk 9 is fixed to the third base 363 that is different from the first base 361 and the second base 362, and the first base 361 and the third base 363 are connected to each other across the second base 362. As a result, noise generated by direct electricity from the reagent disk 9, mechanical vibration, or temperature change on the reaction disk 1 and the spectrophotometer 4B fixed to the first base 361 can be reduced, and higher-accuracy analysis can be reliably and easily implemented.

<Others>

The present invention is not limited to the above-described embodiment, and various modifications and applications can be made. The embodiment has been described in detail in order to easily describe the present invention, and the present invention is not necessarily to include all the configurations described above.

REFERENCE SIGN LIST

1: reaction disk
2: reaction container
2A: reaction liquid
3: cleaning mechanism
4A: light source
4B: spectrophotometer
4B1, 4B2: condenser lens
4B3: slit
4B4: concave diffraction grating
4B5: multi-wavelength detector
5: stirring mechanism
7: reagent dispensing mechanism
7a: reagent nozzle
9: reagent disk
10: reagent bottle
11: sample dispensing mechanism
11a: sample nozzle
13, 30, 32: cleaning tank
15: sample container
16: rack
17: sample transport mechanism
18a: pump for reagent
18c: pump for sample
20: cleaning pump
21: controller
22: vacuum pump
41: sample discharging position
42, 42A: sample suction position
43, 43A: first reagent discharging position
44, 44A: second reagent discharging position
45, 45A: first stirring position
46, 46A: second stirring position
47: light absorbance measurement position
100: automatic analysis device
301: first rotation axis
302: second rotation axis
311: straight line
321: first reagent suction position
322: second reagent suction position
331, 332: semicircle
341: electrolyte measurement unit
351: casing
352: first corner
353: second corner
354: third corner
355: fourth corner
361: first base
362: second base
363: third base
371, 372, 373: pillar
391, 392, 393, 394: side

The invention claimed is:

1. An automatic analysis device comprising:
a reaction disk that includes a plurality of reaction containers circumferentially arranged thereon, the reaction container being configured to react a sample with the reagent;
a reagent disk configured to keep a plurality of reagent containers containing the reagent;
a stirring mechanism configured to stir a liquid held in the reaction container;
a measurement unit configured to measure physical properties of the liquid held in the reaction container; and
a cleaning mechanism configured to clean the reaction container after the measurement, wherein
when a housing constituting the automatic analysis device is viewed from a top side,
the reaction disk is disposed on a first corner side that is one of two corners located at both ends of a first side on a front surface side of the housing to be accessed by a user,
the reagent disk is disposed on a rear surface side of the housing facing the first side, and on a second corner side located diagonally to the first corner among two corners located on both ends of a second side,
the measurement unit is disposed on a straight line passing through a rotation axis of the reagent disk and a rotation axis of the reaction disk and on the first corner side than the rotation axis of the reaction disk around the reaction disk, and
when an orthogonal line passing through the rotation axis of the reaction disk and orthogonal to the straight line is drawn, the stirring mechanism and the cleaning mechanism are disposed on the reagent disk side of the orthogonal line.

2. The automatic analysis device according to claim 1, wherein
the straight line is neither parallel nor vertical to any of sides of the housing.

3. The automatic analysis device according to claim 1, wherein the measurement unit includes a slit that is configured to diffract light passing through the liquid in the reaction container, a diffraction grating that is configured to disperse light passing through the slit, and a multi-wavelength detector that is configured to detect the light dispersed by the diffraction grating, and at least the diffraction grating and the multi-wavelength detector are arranged on the straight line.

4. The automatic analysis device according to claim 1, further comprising:

a reagent dispensing mechanism that is configured to dispense the reagent into the reaction containers, wherein the reagent dispensing mechanism is arranged at a position adjacent to outer peripheries of the reaction disk and the reagent disk.

5. The automatic analysis device according to claim 4, further comprising:

a sample dispensing mechanism that is configured to dispense the sample into the reaction containers, wherein in the reaction containers of the reaction disk stopped during dispensing of the sample by the sample dispensing mechanism or during dispensing of the reagent by the reagent dispensing mechanism, a reaction container arranged at a position closest to the measurement position of the measurement unit is a reaction container during or after cleaning by the cleaning mechanism.

6. The automatic analysis device according to claim 4, wherein the reagent disk has a reagent suction position to be accessed by the reagent dispensing mechanism when the reagent is dispensed into the reaction container, and the reagent suction position is arranged on the straight line.

7. The automatic analysis device according to claim 4, further comprising:

a sample dispensing mechanism that is configured to dispense the sample into the reaction containers, wherein the reaction disk is configured to rotationally move and stop the reaction containers at least once within one cycle, and a sample discharging position of the sample dispensing mechanism is set while the reaction disk is rotationally moved from the measurement unit to a reagent disk side.

8. The automatic analysis device according to claim 4, wherein the reaction disk rotates and stops the reaction container at least once within one cycle, and a stirring position of the stirring mechanism is provided while the reaction disk is rotationally moved from the reagent disk to a measurement unit side.

9. The automatic analysis device according to claim 1, wherein when a total number of the reaction containers is set to N, the number of the reaction containers by which the reaction disk moves in one cycle is set to A (N+1 A), and after B (B≥1) cycles, the reaction disk is set to rotationally move by C (C≥1) rotations±a movement amount equivalent to one reaction container, the N and the A are mutually prime, the B and the C are mutually prime, the B is an odd number, and the reaction disk is rotationally controlled such that the reaction container moves by an amount A in the circumferential direction in one cycle so as to satisfy a relationship of A×B=N×C±1.

10. The automatic analysis device according to claim 1, wherein the reaction disk and the measurement unit are fixed to the same first base.

11. The automatic analysis device according to claim 10, further comprising:

a sample dispensing mechanism that is configured to dispense the sample into the reaction containers and a reagent dispensing mechanism that is configured to dispense the reagent into the reaction containers, wherein the sample dispensing mechanism, the reagent dispensing mechanism, and the stirring mechanism are fixed to a second base that is different from the first base.

12. The automatic analysis device according to claim 11, wherein the reagent disk is fixed to a third base that is different from the first base and the second base, and the first base and the third base are connected to each other across the second base.

13. The automatic analysis device according to claim 1, wherein a position at which the physical properties of the liquid held in the reaction container are measured by the measurement unit is a position at which the reaction container is stopped during or after cleaning in which the measurement is finished and cleaning by the cleaning mechanism is started.

14. The automatic analysis device according to claim 1, further comprising:

a reagent dispensing mechanism that is configured to dispense the reagent into the reaction containers and has a plurality of rotation axes.

* * * * *